US012716522B2

(12) United States Patent
Phillips et al.

(10) Patent No.: US 12,716,522 B2
(45) Date of Patent: Aug. 25, 2026

(54) VIBRATION REDUCING DEVICE

(71) Applicant: FMC Technologies, Inc., Houston, TX (US)

(72) Inventors: Ryan Phillips, Houston, TX (US); John Calder, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 18 days.

(21) Appl. No.: 18/949,704

(22) Filed: Nov. 15, 2024

(65) Prior Publication Data

US 2026/0139763 A1 May 21, 2026

(51) Int. Cl.
*F16K 47/00* (2006.01)

(52) U.S. Cl.
CPC .................................. *F16K 47/012* (2021.08)

(58) Field of Classification Search
CPC ...... F16K 47/012; F16K 41/04–41/046; F16K 41/02–41/026
See application file for complete search history.

(56) References Cited

U.S. PATENT DOCUMENTS 4,294,428 A * 10/1981 Okada .................. F16K 1/2268
251/307
10,670,166 B2 * 6/2020 Gradle .................... F16K 41/02
10,969,030 B2 * 4/2021 Jackson ................ F16K 27/048
11,885,437 B2 * 1/2024 Allen ...................... F16K 41/04
2024/0218941 A1 * 7/2024 Qian .................... F16J 15/3208

FOREIGN PATENT DOCUMENTS

CN 214946482 U 11/2021
DE 19710077 A1 9/1998

OTHER PUBLICATIONS

International Search Report and Written Opinion issued in Application No. PCT/US2025/052887 mailed on Feb. 23, 2026 (27 pages).

* cited by examiner

*Primary Examiner* — Michael R Reid
(74) *Attorney, Agent, or Firm* — Osha Bergman Watanabe & Burton LLP

(57) ABSTRACT

Devices and methods for reducing vibrations. Methods include inserting a device for reducing vibrations within a pressure-control device, where the pressure-control device includes at least one movable element. The device for reducing vibrations includes a first body comprising a first material inserted adjacent to the at least one movable element and a second body comprising a second material, positioned radially opposite the first body. In one or more embodiments, the method also includes moving the at least one movable element of the pressure-control device and absorbing a portion of vibrations, introduced by moving the at least one movable element, using the device for reducing vibrations.

8 Claims, 9 Drawing Sheets

320
302
206
322
300
304

208
340
302
346
354
206
344
300
352
348
242
304
350

360
302
344
346
378
366
372
370
362
364
376
304
379
368
374
348
350

VIBRATION REDUCING DEVICE

BACKGROUND

A choke valve (hereinafter simply "choke") is used in various industries to regulate a flow of fluid, such as fluid flowing through a pipeline. Industries may include the oil and gas industry, power generation industry, and water treatment industry. To regulate a flow of fluid, the choke uses an orifice configured to adjust the flow rate of the fluid based on the Venturi effect. The orifice may be fixed or adjustable. A fixed orifice cannot change size and, therefore, only adjusts the fluid to a single flow rate. In contrast, when an adjustable orifice is fully open, the fluid flows through the choke at a maximum flow rate. When the adjustable orifice is fully closed, the fluid stops at the choke. Accordingly, the adjustable orifice may be adjusted to allow the fluid to flow through the choke at a prescribed flow rate.

Various design considerations should be considered when designing a choke. In some environments, a choke may be designed for low-pressure, low-flow applications. In other environments, a choke may be designed for high-pressure, high-flow applications. Accordingly, the design of the choke should adequately withstand its environment by operating safely and efficiently and by being durable.

As with any device used in oil and gas operations, a choke may be subjected to typical extreme wellhead conditions, including but not limited to high fluid flow rates. Upon flowing fluids of high flow rates through the choke, one or more components of the choke may experience mechanical vibrations. Over time, mechanical vibrations of the components within a choke may lead to wear and eventually damage or failure of the components. Accordingly, there exists a need for a device to prolong the lifetime of choke components by dampening or reducing vibrations therein.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a first device for reducing vibrations, including a first body having a first outward-facing outer wall surface and a first inward-facing inner wall surface, where a portion of the first outward-facing outer wall surface is removed to form a first cutout portion and a second body having a second outward-facing outer wall surface and a second inward-facing inner wall surface. In one or more embodiments, the second body is radially stacked around the first outward-facing outer wall surface within the first cutout portion of the first body, and the first device is configured to absorb mechanical vibrations within a pressure-control device.

In another aspect, embodiments disclosed herein relate to a second device for reducing vibrations, including a third body having a third outward-facing outer wall surface and a third inward-facing inner wall surface, where a portion of the third inward-facing inner wall surface is removed to form a third cutout portion and a fourth body having a fourth outward-facing outer wall surface and a fourth inward-facing inner wall surface. In one or more embodiments, the fourth body is radially stacked around the third inward-facing inner wall surface within the third cutout portion of the third body, and the second device is configured to absorb mechanical vibrations within a pressure-control device.

In yet another aspect, embodiments disclosed herein relate to a method for reducing vibrations, including inserting a device for reducing vibrations within a pressure-control device. In one or more embodiments, the pressure-control device includes at least one movable element. In one or more embodiments, the device for reducing vibrations includes a first body comprising a first material inserted adjacent to the at least one movable element and a second body comprising a second material, positioned radially opposite the first body. In one or more embodiments, the method also includes moving the at least one movable element of the pressure-control device and absorbing a portion of vibrations, introduced by moving the at least one movable element, using the device for reducing vibrations.

Other aspects and advantages of the claimed subject matter will be apparent from the following description and the appended claims.

DETAILED DESCRIPTION

Embodiments disclosed herein generally relate to devices and methods for reducing vibrations. In some embodiments, a device may be used within a choke valve, where the choke valve is configured to regulate a flow of fluid. Accordingly, devices for reducing vibrations may reduce the wear and tear of one or more parts of the choke to increase the durability and, in turn, the lifespan of the choke or other pressure-control device.

In one aspect, embodiments disclosed herein relate to a system for reducing vibrations. The system for reducing vibrations may include a pressure-control device, a first device for reducing vibrations and a second device for reducing vibrations. An example system for reducing vibrations is presented in FIG. 1B. Specifically, in FIG. 1B a choke valve insert 105 is presented as an example pressure-control device used in a system for reducing vibrations according to one or more embodiments. While a choke valve insert 105 is presented in FIG. 1B, the choke is merely described as one example of a system where a vibration-reducing device may be advantageously used and is not intended to be limiting. As would be understood by one of ordinary skill in the art, the devices for reducing vibrations according to one or more embodiments may be used to absorb and dissipate vibrations in any pressure-control device known in the art. Examples of pressure-control devices include but are not limited to choke valves (for example, conventional choke valves, positive choke valves, multi-stage choke valves, automatic choke valves, hydraulic choke valves, etc.) and gate valves.

Figure 1A:
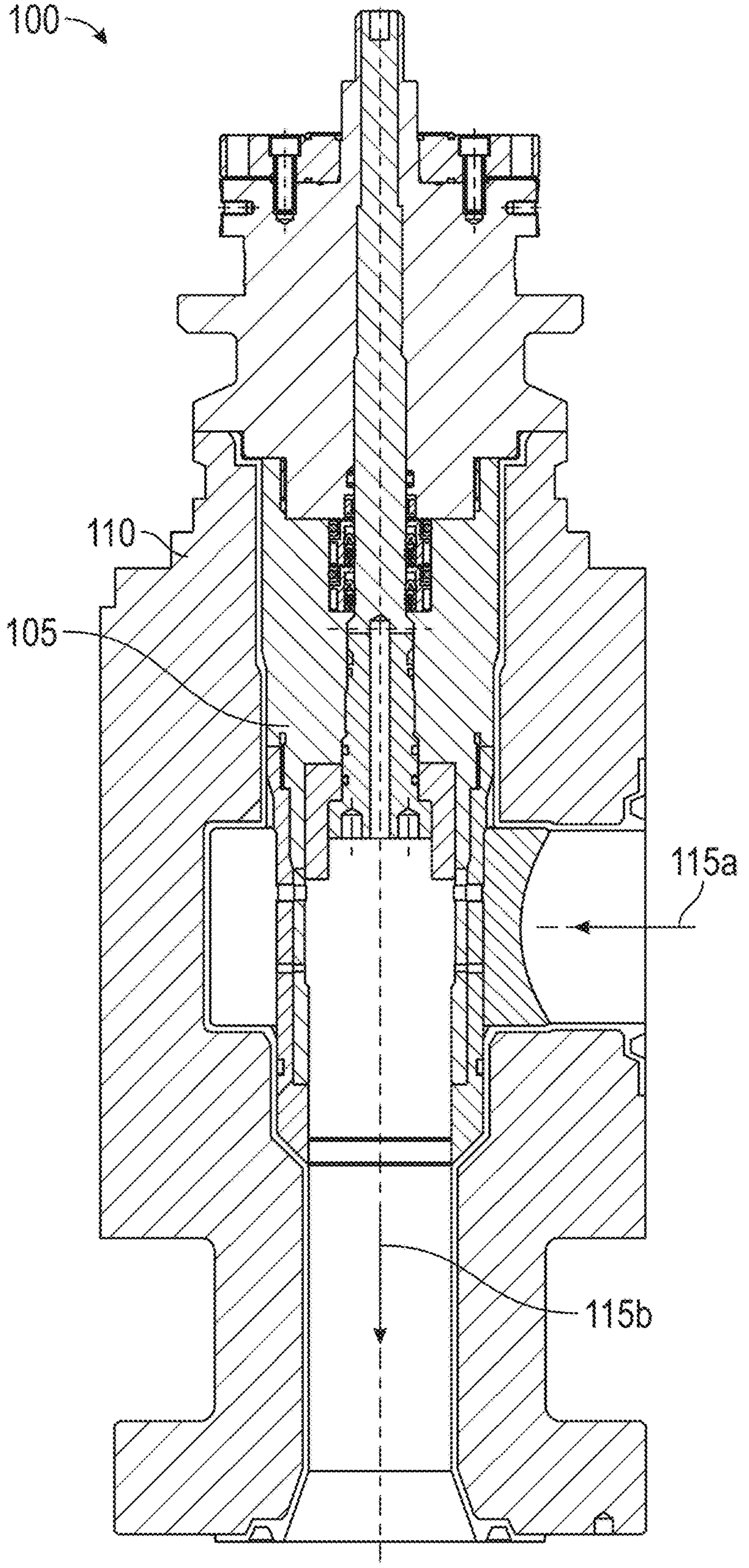
FIG. 1A shows an example of a choke valve in accordance with one or more embodiments.

Turning to FIG. 1A, FIG. 1A illustrates a choke valve 100 in accordance with one or more embodiments. In some embodiments, the choke valve 100 includes a choke valve insert 105 disposed within a valve body 110. In some embodiments, the choke valve 100 may be disposed along a pipeline or at a wellhead, though neither is shown in FIG. 1A. The flow of fluid flowing through, for example, the pipeline prior to entering the choke valve 100 may be specifically referred to as "upstream fluids" or an "upstream flow of fluid" 115*a*. The flow of fluid flowing through the pipeline after having passed through the choke valve 100 may be specifically referred to as "downstream fluids" or a "downstream flow of fluid" 115*b*. The flow of fluid received by and/or flowing through the choke valve insert 105 of the choke valve 100 may be hereinafter referred to as simply the "fluids" or "flow of fluid." The flow of fluid flowing through the choke valve insert 105 is the main flow of fluid that the choke valve insert 105 is designed to regulate. That is, the choke valve insert 105 is configured to receive an upstream flow of fluid 115*a*, regulate the flow of fluid, and produce a downstream flow of fluid 115*b* as shown by the arrows in FIG. 1A. Hereinafter, the term "fluid" denotes a liquid, gas, or combination thereof. The fluid may be any fluid and is not meant to be limiting.

Though FIG. 1A specifically illustrates an adjustable subsea choke valve known as a plug-and-cage style choke valve, a person of ordinary skill in the art will appreciate that the disclosed seal assembly may be used with other types of choke valves in many types of environments. Other types of choke valves include, without limitation, conventional choke valves, positive choke valves, multi-stage choke valves, automatic choke valves, hydraulic choke valves, etc. Further, a person of ordinary skill in the art will appreciate that the disclosed seal assembly may be disposed within other types of valves or any hardware where the ability to return fluid that has leaked past a seal to the main flow of fluid may be desirable.

Figure 1B:
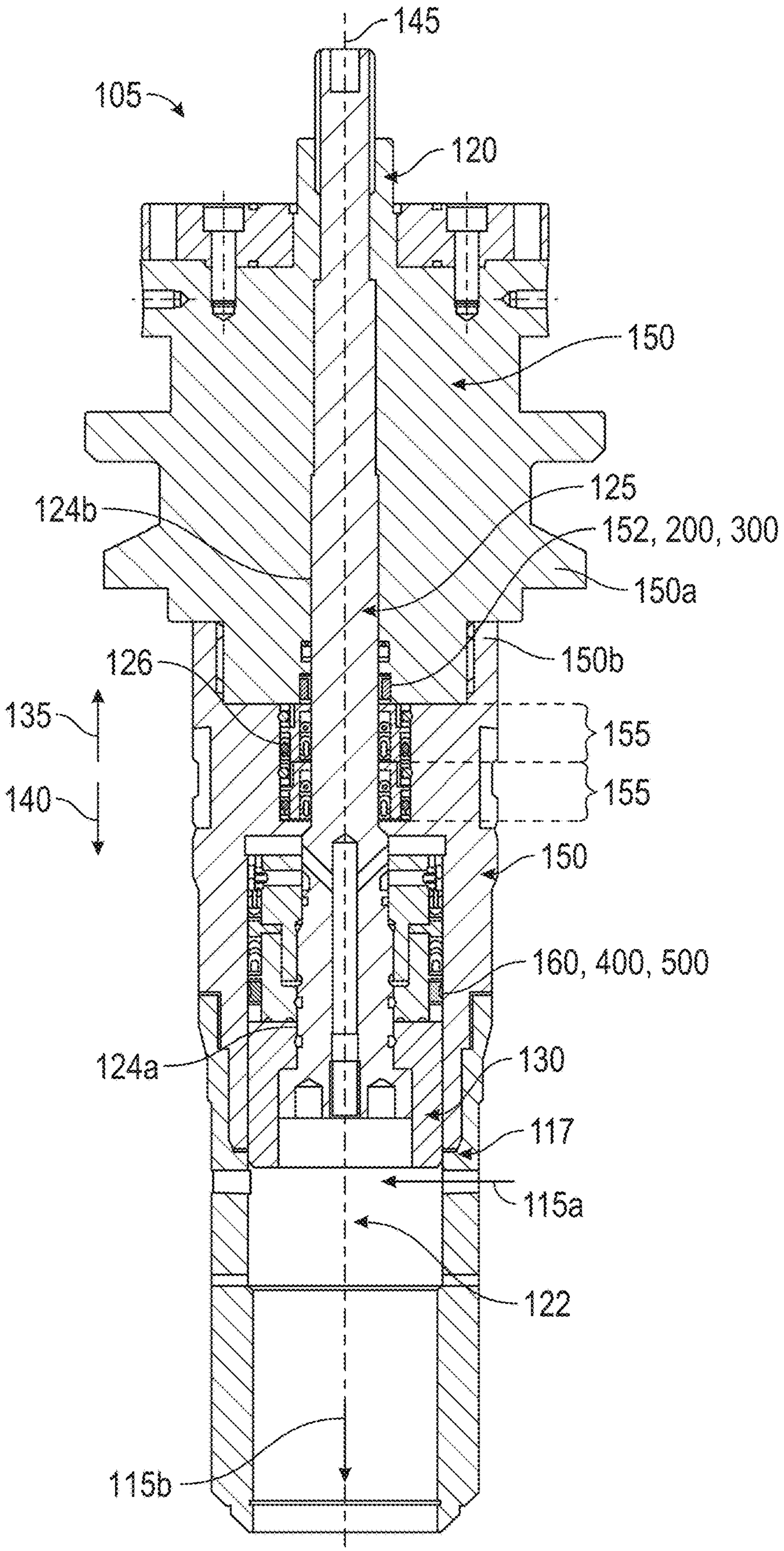
FIG. 1B shows an example system for reducing vibrations in accordance with one or more embodiments.

Turning to FIG. 1B, FIG. 1B illustrates a choke valve insert 105 in accordance with one or more embodiments. Though the choke valve insert 105 is oriented where inferior 140 is down and superior 135 is up, the choke valve insert 105 may be in any orientation when in use.

The choke valve insert 105 may include a cage 117, bonnet 150, plug 130, valve stem 125, drive nut 120, and seal assembly 155, among other parts. The cage 117 has an orifice 122. The orifice 122 is a type of cavity, chamber, or opening. The bonnet 150 is disposed superior 135 to the cage 117. The bonnet 150 may include a bonnet hub 150*a* and bonnet insert 150*b*. Hereinafter, the term "bonnet" generically denotes the bonnet hub 150*a*, bonnet insert 150*b*, or both. Further, the bonnet 150 has a stem bore and cavity 126. Both the stem bore and cavity 126 are types of cavities, chambers, or openings. The stem bore may be separated into a lower stem bore 124*a* and upper stem bore 124*b*. The plug 130 may be fixed to an inferior end of the valve stem 125. The valve stem 125 and/or plug 130 may be disposed, in part, within the stem bore 124*a, b* of the bonnet 150. In some embodiments, the valve stem 125 and/or plug 130 are further disposed, in part, within the orifice 122 of the cage 117. The seal assembly 155 is disposed within the cavity 126 and around the stem bore 124*a, b* of the bonnet 150. Though FIG. 1B illustrates the cavity 126 somewhat centered along the bonnet 150 and open to the stem bore 124*a, b*, the cavity 126 that the seal assembly 155 is disposed within may be along an inferior or superior portion of the bonnet 150 without departing from the scope of the disclosure.

Turning to the function of the choke valve insert 105, the orifice 122 is configured to receive the upstream flow of fluid 115*a* as shown by the arrows in FIG. 1B. In some embodiments, the upstream flow of fluid 115*a* is received by the orifice 122 when the upstream flow of fluid 115*a* flows through a collection of holes (not shown) in the cage 117 to thereby enter the orifice 122. However, a person of ordinary skill in the art will appreciate the cage 117 and orifice 122 could be different. Other types of cages 115 and orifices 122 may include, without limitation, cage and external sleeves, needle and seats, and rotating discs.

The drive nut 120 is configured to translate the valve stem 125 and plug 130 within, at least in part, the stem bore 124*a, b* along an axis 145. Translation of the valve stem 125 and plug 130 into the orifice 122 (i.e., inferior 140 along the axis 145) causes the plug 130 to enter, at least in part, the orifice 122 thereby restricting or decreasing the flow of fluid that can flow through the orifice 122. This process may be referred to as "closing the choke valve insert." Translation of the valve stem 125 and plug 130 out of the orifice 122 (i.e., superior 135 along the axis 145) causes the plug 130 to exit, at least in part, the orifice 122 thereby increasing the flow of fluid that can flow through the orifice 122. This process may be referred to as "opening the choke valve insert." Accordingly, the valve stem 125 and plug 130 are configured to regulate the flow of fluid by controlling how much fluid flows through the orifice 122. In turn, the downstream flow of fluid 115*b* may flow at a prescribed flow rate and prescribed pressure among other prescribed variables.

In some environments, the pressure gradient and/or flow rate may cause the choke valve 100 including choke valve insert 105 or portions thereof to vibrate. In turn, the choke valve 100, adjacent hardware (e.g., pipeline, wellhead), and/or a connection between the choke valve 100 and adjacent hardware may be damaged due to the vibrations thereby reducing the lifespan of the part(s).

The disclosed devices 200, 300, 400, and 500 for reducing vibrations may advantageously mitigate vibrations. In some embodiments, one or more of a first device (200, 300) and a second device (400, 500) for reducing vibrations may be positioned within a choke valve insert 105. FIG. 1B illustrates how the first device (200, 300) and the second device (400, 500) for reducing vibrations may be inserted in a choke valve insert 105 in accordance with one or more embodiments. In FIG. 1B, a first device (200, 300) for reducing vibrations may be located at a first location 152 within the choke valve insert 105 and a second device (400, 500) for reducing vibrations may be located at a second location 160 within the choke valve insert 105. The first location 152 shown in FIG. 1B may be adjacent to a superior 135 portion of the valve stem 125, where the first device (200, 300) for reducing vibrations may be inserted radially around a portion of the valve stem 125. The second device (400, 500) for reducing vibrations may be inserted radially around a portion of the bonnet 150 at the second location 160 shown in FIG. 1B. The second location 160 may be adjacent to an inferior 140 portion of the valve stem 125. Accordingly, the first device (200, 300) and the second device (400, 500) for reducing vibrations may be configured to absorb mechanical vibrations introduced by movement of the valve stem 125.

Furthermore, a portion of the disclosed devices 200, 300, 400, and 500 may be constructed of a material designed to deform and dampen mechanical vibrations, for example an elastomer. Elastomers are defined herein as a polymer material which has the ability to be stretched or deformed and return to its original shape. Suitable elastomers will be described in more detail in the following sections. In one or more embodiments, an elastomeric portion as part of the disclosed devices (e.g., a first device 200, 300 and a second device 400, 500) may have suitable materials properties for dampening vibrations. For example, the elastomeric portion may elastically deform (e.g., "squeeze") upon activation of the choke valve 100, thereby limiting side to side (e.g., radial) movement of the stem. Furthermore, upon elastomeric deformation, the elastomeric portion may also absorb vibrational energy and convert the absorbed vibrational energy into other forms of energy, such as heat.

While FIG. 1B shows a first device (200, 300) for reducing vibrations located at a first location 152 and a second device (400, 500) for reducing vibrations located at a second location 160, the first device (200, 300) for reducing vibrations and the second device (400, 500) for reducing vibrations may be positioned in other locations within the choke valve insert 105 shown in FIG. 1B, as would be understood by one of ordinary skill in the art. In some embodiments, the first device (200, 300) for reducing vibrations and/or the second device (400, 500) for reducing vibrations may be disposed in only one portion or in multiple portions of the choke valve insert 105. In other embodiments, the first device (200, 300) for reducing vibrations and/or the second device (400, 500) for reducing vibrations may be disposed within hardware or portions thereof other than a choke valve insert 105. In one or more embodiments, a first device (200, 300) for reducing vibrations and a second device (400, 500) for reducing vibrations may be placed at an axial distance as far from each other as possible in order to maximize vibration reduction within a pressure-control device, such as a choke valve insert 105.

FIGS. 2A-E show a first embodiment of a first device 200 for reducing vibrations in accordance with one or more embodiments. The first embodiment of a first device 200 for reducing vibrations has a dynamic interface on an inner diameter as will be described below. As would be understood by one of ordinary skill in the art, reducing vibrations using a dynamic interface on an inner diameter may advantageously be used when the inner diameter contacts a sliding portion of the choke valve 100 (e.g., a portion of the choke valve 100 that slides when the choke valve 100 is opened or closed).

Figure 2A:
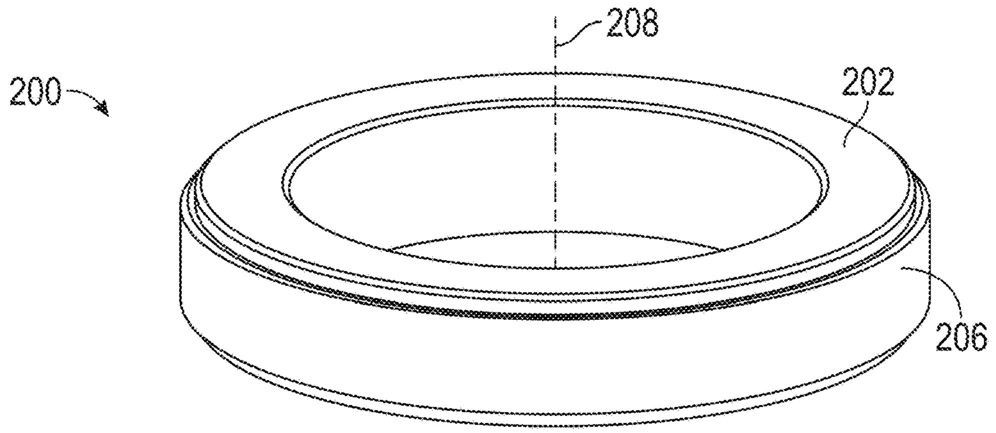
FIGS. 2A-C illustrate a first embodiment of a first device for reducing vibrations in accordance with one or more embodiments.

FIG. 2A is an isometric view of a first embodiment of a first device 200 for reducing vibrations according to one or more embodiments. The first embodiment of the first device for reducing vibrations may include a first body 202 and a second body 206. As shown in FIG. 2A, the second body 206 may be radially inserted around an outer surface of the first body 202 about a first device internal axis 208.

Figure 2B:
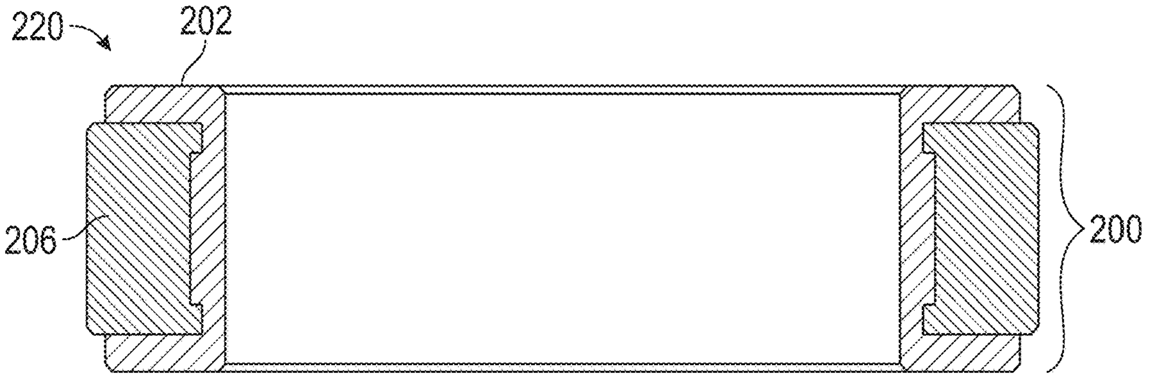

FIG. 2B shows a first cutaway view 220 of the first embodiment of the first device 200 for reducing vibrations. In FIG. 2B, the second body 206 is radially inserted around the first body 202.

Figure 2C:
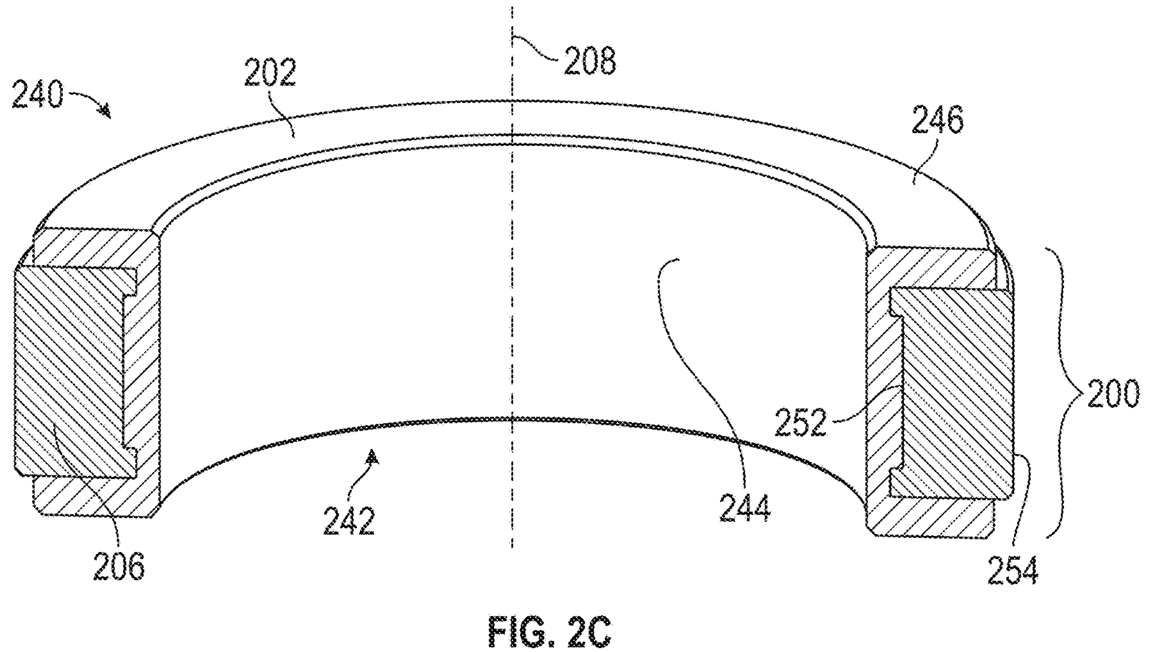

FIG. 2C shows a second cutaway view 240 of the first embodiment of the first device 200. As best shown in FIG. 2C, the first body 202 includes a first inward-facing inner wall surface 244 and a first outward-facing outer wall surface 246. As will be shown in more detail in FIG. 2D, a portion of the first outward-facing outer wall surface 246 of the first body 202 may be removed to form a first cutout portion (e.g., 262 in FIG. 2D). The second body 206 includes a second outward-facing outer wall surface 254 and a second inward-facing inner wall surface 252.

The first inward-facing inner wall surface 244 may define a first device inner chamber 242 passing along a first device internal axis 208 of the first embodiment of the first device 200 for reducing vibrations. In one or more embodiments, the second body 206 may be radially inserted around the first outward-facing outer wall surface 246 within the first cutout portion 262 of the first body 202.

Figure 2D:
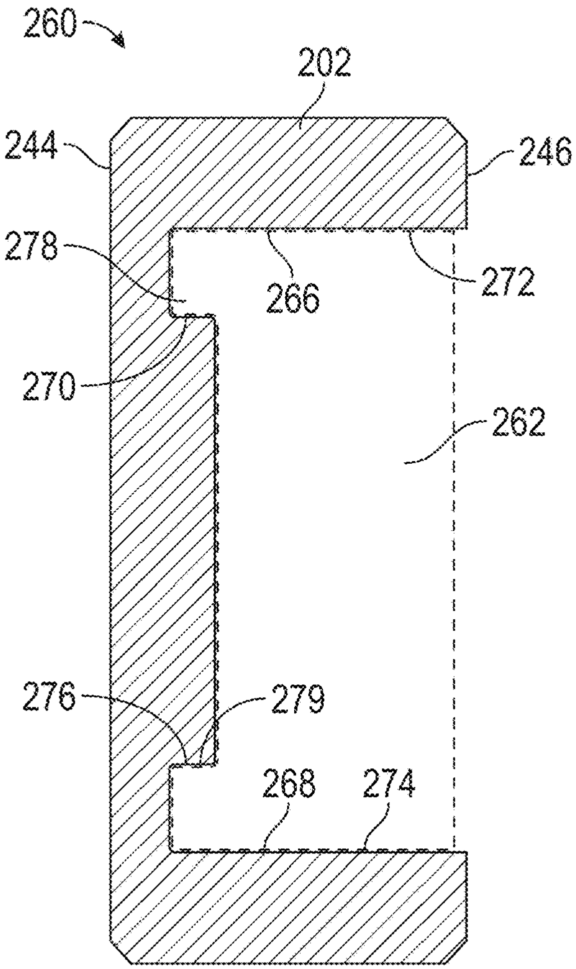
FIG. 2D shows a side view of a first body in accordance with one or more embodiments.

FIG. 2D shows a side profile view 260 of the first body 202 in the first embodiment of the first device 200 for reducing vibrations. In one or more embodiments, the first body 202 includes a first cutout portion 262, as described above. The first cutout portion 262 may define a first body first step 266 which includes a substantially flat surface on the first body 202 formed on a first cutout portion first upper side 272. In one or more embodiments, the first body 202 further includes a first body second step 270. The first body second step 270 may be formed by a first cutout portion first lower side 278 within the first outward-facing outer wall surface 246 of the first body 202.

On an axially opposite side of the first cutout portion 262 may be a first body third step 268 including a substantially flat surface on the first body 202 formed on a first cutout portion second lower side 274. In one or more embodiments, the first body 202 further includes a first body fourth step 276. The first body fourth step 276 may be defined by a first cutout portion second upper side 279 within the second outward-facing outer wall surface 250 second body 204.

Figure 2E:
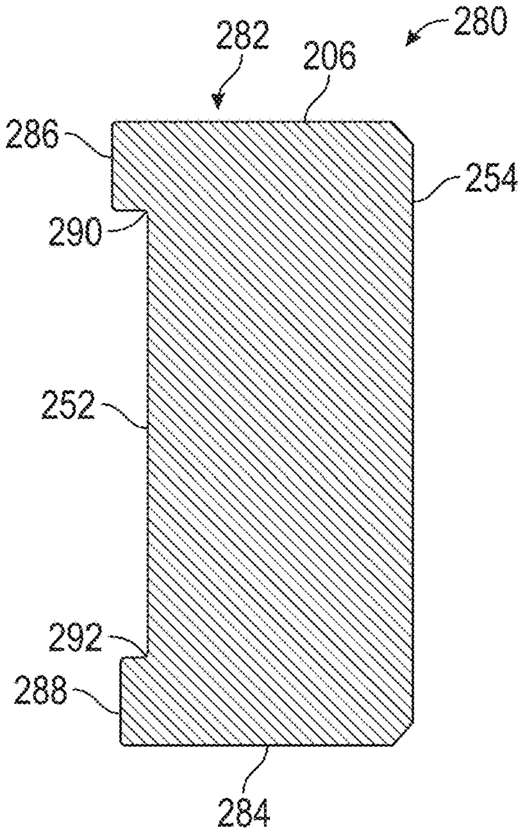
FIG. 2E shows a side view of a second body in accordance with one or more embodiments.

FIG. 2E shows a side profile view 280 of a second body 206 in the first embodiment of the first device 200 for reducing vibrations. In one or more embodiments, the second body 206 includes a second body upper side 282 and a second body 206 lower side 284, opposite the second body upper side 282. The second body 206 may further include a second body first nub 286 extending from the second inward-facing inner wall surface 252 proximate the second body upper side 282. The second body first nub 286 includes a portion of the second body 206 that extends a distance beyond the second inward-facing inner wall surface 252. In accordance with one or more embodiments, the second body first nub 286 has a rectangular-like edge and is configured to fit within a portion of the first body 202.

Furthermore, the second body 206 may also include a second body second nub 288 extending from the second inward-facing inner wall surface 252 proximate the second body lower side 284. The second body second nub 288 includes a portion of the second body 206 that extends a distance beyond the second inward-facing inner wall surface 252. In accordance with one or more embodiments, the second body second nub 288 has a rectangular-like edge and is configured to fit within a portion of the second body 204.

In one or more embodiments, the first body third step (268 in FIG. 2D) is configured to abut the second body lower side 284 and the first body first step (266 in FIG. 2D) is configured to abut the second body upper side 282. The first body second step 270 may abut a second body first nub lower side 290 on the second body first nub 286. Similarly, the first body fourth step 276 may abut a second body second nub upper side 292 on the second body second nub 288.

In one or more embodiments, the first embodiment of a first device 200 for reducing vibrations may be configured to absorb mechanical vibrations within a pressure-control device (e.g., the choke valve 100 shown in FIG. 1A).

The first body 202 of one or more embodiments may be constructed of a material which is capable of providing a dynamic interface between the first embodiment of a first device 200 for reducing vibrations and one or more other components within a system (e.g., choke valve 100 shown in FIG. 1A). Specifically, the material used to construct the first body 202 may preferably have a low coefficient of friction. Examples of suitable materials which may be used to construct the first body 202 include but are not limited to polytetrafluoroethylene (PTFE), hard polyurethanes, and polyetheretherketone (PEEK).

The material used to construct the first body 202 may also contain one or more additives or fillers. Examples of additives and fillers include but are not limited to molybdenum disulfide ($MoS_2$), glass, graphite, and carbon.

The second body 206 of one or more embodiments may be constructed of a material having a high dampening capacity. Examples of suitable materials which may be used to construct the second body 206 include but are not limited to elastomers. Examples of elastomers include but are not limited to rubbers such as natural and synthetic rubber, hydrogenated nitrile butadiene rubber (HNBR) fluoroelastomers such as fluorine kautschuk material (FKM), FPM, fluorine based copolymers and terpolymers, or any other thermoset rubbers or thermoset composites.

The material used to construct the second body 206 may generally have high dampening capacity, resistance to creep, and high degradation temperature. Accordingly, a suitable material for constructing the second body 206 may be selected depending on wellbore conditions including time, temperature, frequency, and loading.

FIGS. 3A-D show a second embodiment of a first device 300 for reducing vibrations in accordance with one or more embodiments. The second embodiment of a first device 300 for reducing vibrations has a dynamic interface on an inner diameter as will be described below. As would be understood by one of ordinary skill in the art, reducing vibrations using a dynamic interface on an inner diameter may advantageously be used when the inner diameter contacts a sliding portion of the choke valve 100 (e.g., a portion of the choke valve 100 that slides when the choke valve 100 is opened or closed).

Figure 3A:
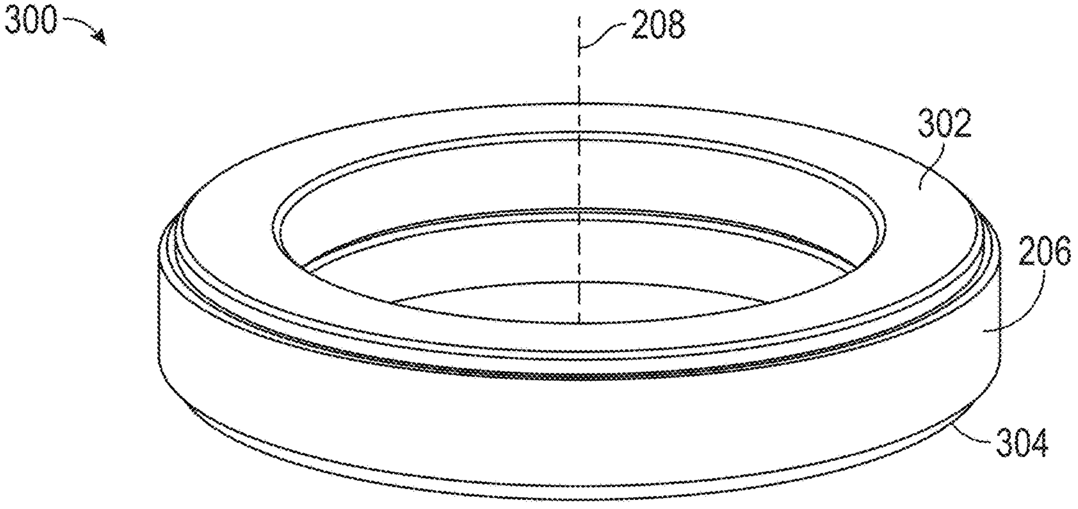
FIGS. 3A-C illustrate a second embodiment of a first device for reducing vibrations in accordance with one or more embodiments.

FIG. 3A is an isometric view of the second embodiment of the first device 300 for reducing vibrations according to one or more embodiments. The second embodiment of the first device for reducing vibrations may include a first body first half 302, a first body second half 304, and a second body 206. As shown in FIG. 3A, the first body first half 302 may be axially stacked on the first body second half 304 about a first device internal axis 208. The second body 206 may be radially inserted around an outer surface of the first body first half 302 and the first body second half 304 around the first device internal axis 208.

Figure 3B:
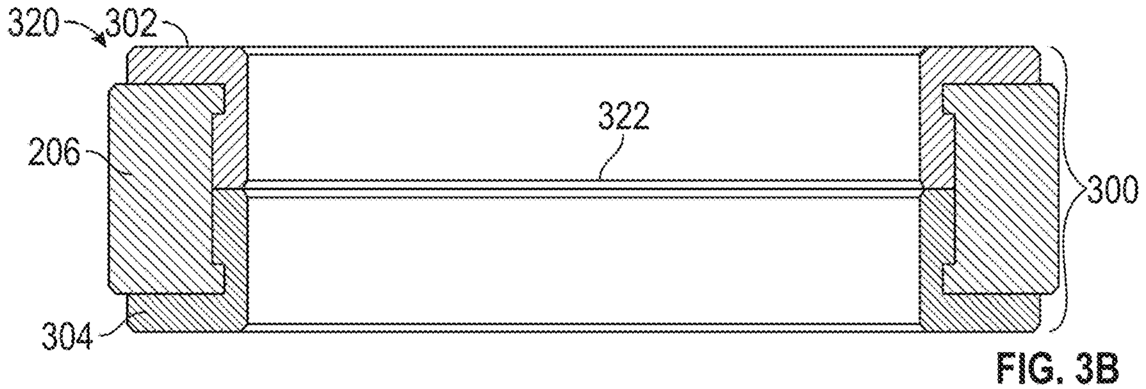

FIG. 3B shows a first cutaway view 320 of the second embodiment of a first device 300 for reducing vibrations. Axially stacking the first body first half 302 on the first body second half 304 may create a small gap 322. The small gap 322 may be created due to chamfers on the inner surfaces of the first body first half 302 and the first body second half 304. In FIG. 3B, the second body 206 is radially stacked around the first body first half 302 and the first body second half 304.

Figure 3C:
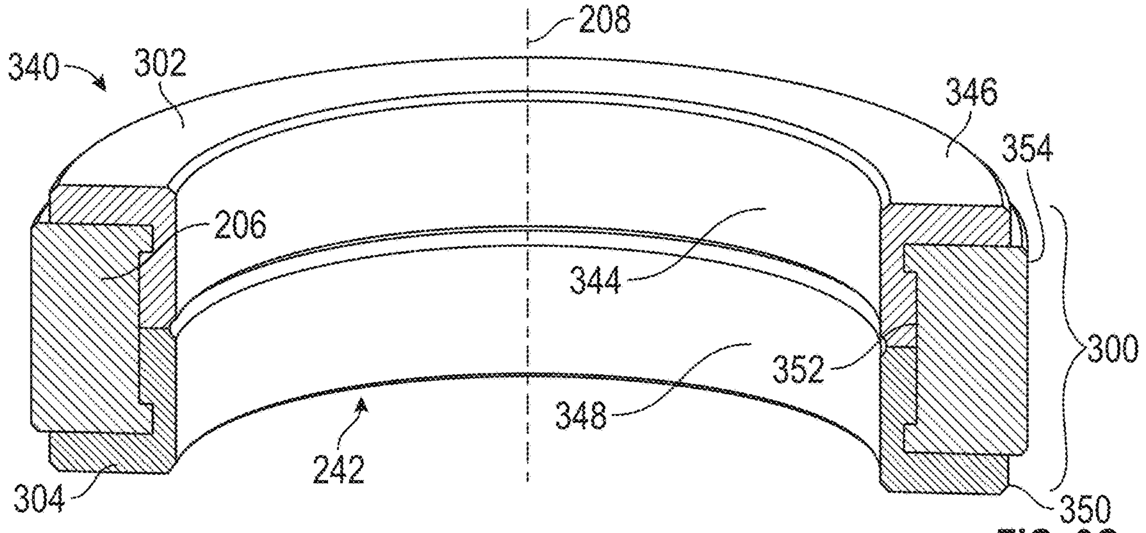

FIG. 3C shows a second cutaway view 340 of a first embodiment of a first device 300 for reducing vibrations in accordance with one or more embodiments. As best shown in FIG. 3C, the first body first half 302 includes a first body first half inward-facing inner wall surface 344 and a first body first half outward-facing outer wall surface 346. As will be shown in more detail in FIG. 3D, a portion of the first body first half outward-facing outer wall surface 346 of the first body first half 302 may be removed to form a first body first half cutout portion (e.g., 362 in FIG. 3D). Similarly, the first body second half 304 includes a first body second half outward-facing outer wall surface 350 and a first body second half inward-facing inner wall surface 348. As will be shown in more detail in FIG. 3D, a portion of the first body second half outward-facing outer wall surface 350 may be removed to form a first body second half cutout portion (e.g., 364 in FIG. 3D).

The second body 206 includes a second outward-facing outer wall surface 354 and a second inward-facing inner wall surface 352. The first half inward-facing inner wall surface 344 and the second half inward-facing inner wall surface 348 may define a first device inner chamber 242 passing along a first device internal axis 208 of the first embodiment of a first device 300 for reducing vibrations. In one or more embodiments, the second body 206 may be radially stacked around the first half outward-facing outer wall surface 346 within the first body first half cutout portion 362 of the first body first half 302 and around the first body second half outward-facing outer wall surface 350 within the first body second half cutout portion 364 of the first body second half 304.

Figure 3D:
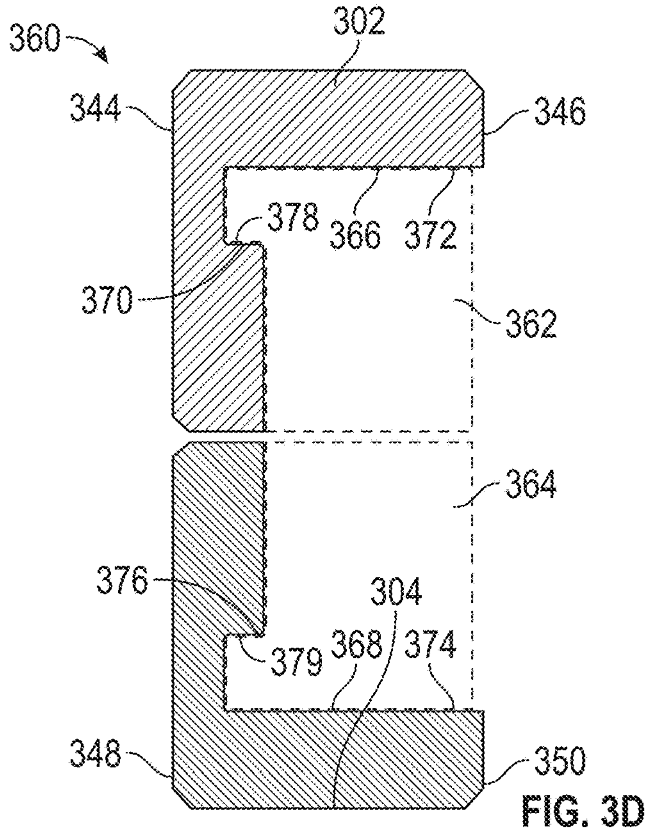
FIG. 3D shows a side view of a first body first half and a first body second half in accordance with one or more embodiments.

FIG. 3D shows a side profile view 360 of the first body first half 302 and the first body second half 304 in the second embodiment of a first device 300 for reducing vibrations in accordance with one or more embodiments. In one or more embodiments, the first body first half 302 includes a first body first half cutout portion 362, as described above. The first body first half cutout portion 362 may define a first body first half first step 366 which includes a substantially flat surface on the first body first half 302 formed on a first body first cutout portion upper side 372. In one or more embodiments, the first body first half 302 further includes a first body first half second step 370. The first body first half second step 370 may be formed by a first body first half cutout portion lower side 378 within the first body first half outward-facing outer wall surface 346 of the first body first half 302.

In one or more embodiments, the first body second half 304 includes a first body second half cutout portion 364, as described above. The first body second half cutout portion 364 may define a first body second half first step 368 which includes a substantially flat surface on the first body second half 304 formed on a first body second half cutout portion lower side 374. In one or more embodiments, the first body second half 304 further includes a first body second half second step 376. The first body second half second step 376 may be formed by a first body second cutout portion upper side 379 within the first body second half outward-facing outer wall surface 350 first body second half 304.

The second body 206 in the second embodiment of the first device 200 for reducing vibrations may have the same components as the second body 206 described in FIG. 2E. For the sake of brevity, the second body 206 will not be described again herein.

In the second embodiment of the first device 300 for reducing vibrations, the second body first nub 286 has a rectangular-like edge and is configured to fit within a portion of the first body first half 302. Similarly, the second body second nub 288 has a rectangular-like edge and is configured to fit within a portion of the first body second half 304. In addition, the first body first half first step 366 is configured to abut the second body upper side 282 and the first body second half first step 368 is configured to abut the second body lower side 284. The first body first half second step 370 may abut a second body first nub lower side 290 on the second body first nub 286. Similarly, the first body second half second step 376 may abut a second body second nub upper side 292 on the second body second nub 288.

In one or more embodiments, the second embodiment of a first device 300 for reducing vibrations may be configured to absorb mechanical vibrations within a pressure-control device (e.g., the choke valve 100 shown in FIG. 1A).

The first body first half 302 of one or more embodiments may be constructed of a material which is capable of providing a dynamic interface between the first embodiment of a first device 300 for reducing vibrations and one or more other components within a system (e.g., choke valve 100 shown in FIG. 1A). Specifically, the material used to construct the first body first half 302 may preferably have a low coefficient of friction. Examples of suitable materials which may be used to construct the first body first half 302 include but are not limited to polytetrafluoroethylene (PTFE), hard polyurethanes, and polyetheretherketone (PEEK).

The material used to construct the first body first half 302 may also contain one or more additives or fillers. Examples of additives and fillers include but are not limited to molybdenum disulfide ($MoS_2$), glass, graphite, and carbon.

The first body second half 304 of one or more embodiments may also be constructed of a material which is capable of providing a dynamic interface between the first embodiment of a first device 300 for reducing vibrations and one or more other components within a system (e.g., choke valve 100 shown in FIG. 1A). Specifically, the material used to construct the first body second half 304 may preferably have a low coefficient of friction. Examples of suitable materials which may be used to construct the first body second half 304 include but are not limited to polytetrafluoroethylene (PTFE), hard polyurethanes, and polyetheretherketone (PEEK).

The material used to construct the first body second half 304 may also contain one or more additives or fillers. Examples of additives and fillers include but are not limited to molybdenum disulfide ($MoS_2$), glass, graphite, and carbon.

In some embodiments, the first body first half 302 and the first body second half 304 may be constructed from the same material. In some embodiments, the first body first half 302 and the first body second half 304 may be constructed from different materials.

The second body 206 of one or more embodiments may be constructed of a material having a high dampening capacity, as described above.

FIGS. 4A-E show a first embodiment of a second device 400 for reducing vibrations in accordance with one or more embodiments. The first embodiment of the second device 400 for reducing vibrations has a dynamic interface on an outer diameter as will be described below. As would be understood by one of ordinary skill in the art, reducing vibrations using a dynamic interface on an outer diameter may advantageously be used when the outer diameter contacts a sliding portion of the choke valve 100 (e.g., a portion of the choke valve 100 that slides when the choke valve 100 is opened or closed).

Figure 4A:
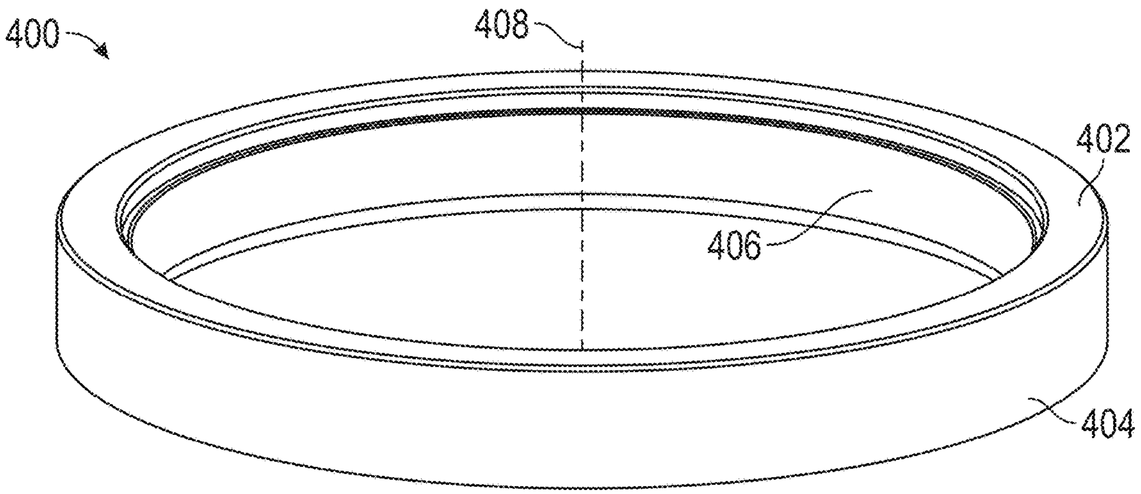
FIGS. 4A-C illustrate a first embodiment of a second device for reducing vibrations in accordance with one or more embodiments.

FIG. 4A is an isometric view of a first embodiment of the second device 400 for reducing vibrations according to one or more embodiments. The first embodiment of the second device 400 for reducing vibrations may include a third body 402 and a fourth body 406. As shown in FIG. 4A, the first embodiment of the second device 400 may have a second device internal axis 408.

Figure 4B:
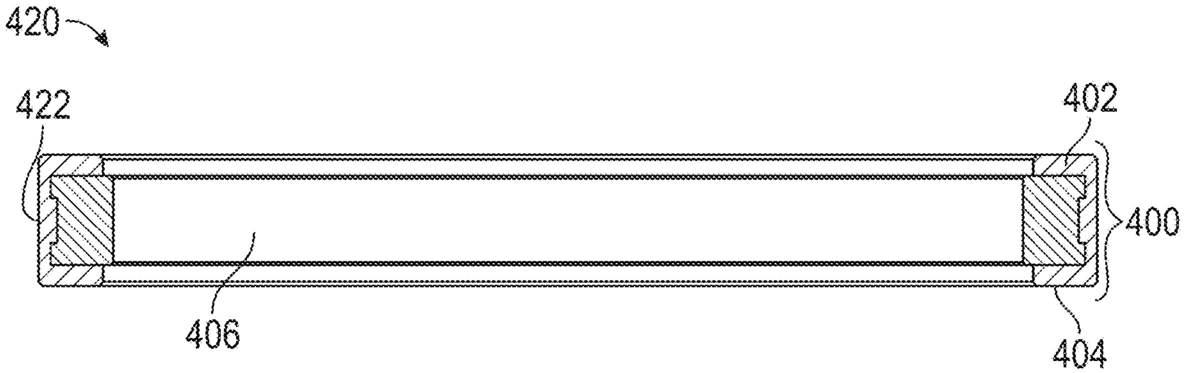

FIG. 4B shows a first cutaway view 420 of a first embodiment of the second device 400 for reducing vibrations. In FIG. 4B, the fourth body 406 may be seen radially inserted around an inner diameter of the third body 402.

Figure 4C:
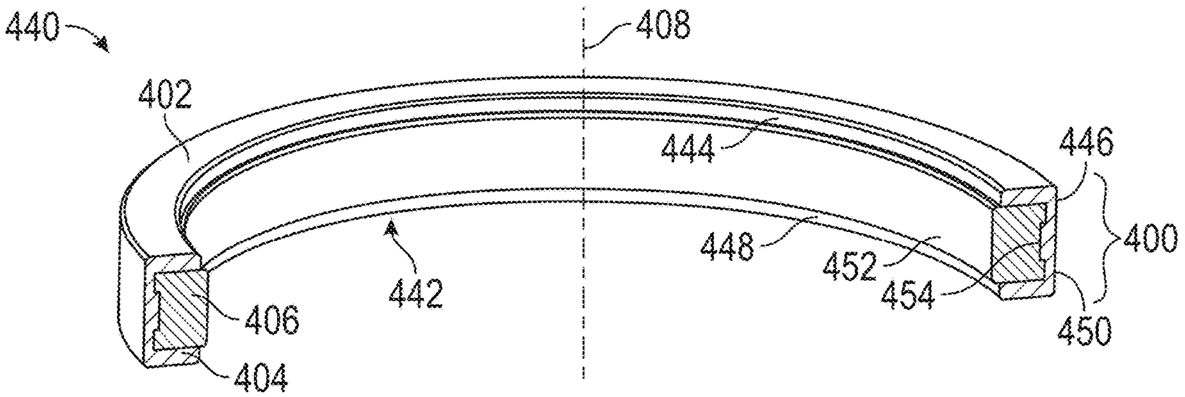

FIG. 4C shows a second cutaway view 440 of a first embodiment of the second device 400 for reducing vibrations in accordance with one or more embodiments. As best shown in FIG. 4C, the third body 402 includes a third inward-facing inner wall surface 444 and a third outward-facing outer wall surface 446. As will be shown in more detail in FIG. 4D, a portion of the third outward-facing outer wall surface 446 of the third body 402 may be removed to form a third body cutout portion (e.g., 462 in FIG. 4D).

The fourth body 406 includes a fourth inward-facing inner wall surface 454 and a fourth outward-facing outer wall surface 452. The fourth inward-facing inner wall surface 454 may define a second device inner chamber 442 passing along a second device internal axis 408 of the first embodiment of the second device 400 for reducing vibrations. In one or more embodiments, the fourth body 406 may be radially inserted in an inner diameter of the third body 402. Specifically, the fourth outward-facing outer wall surface 452 may abut the third body cutout portion 462 of the third body 402.

Figure 4D:
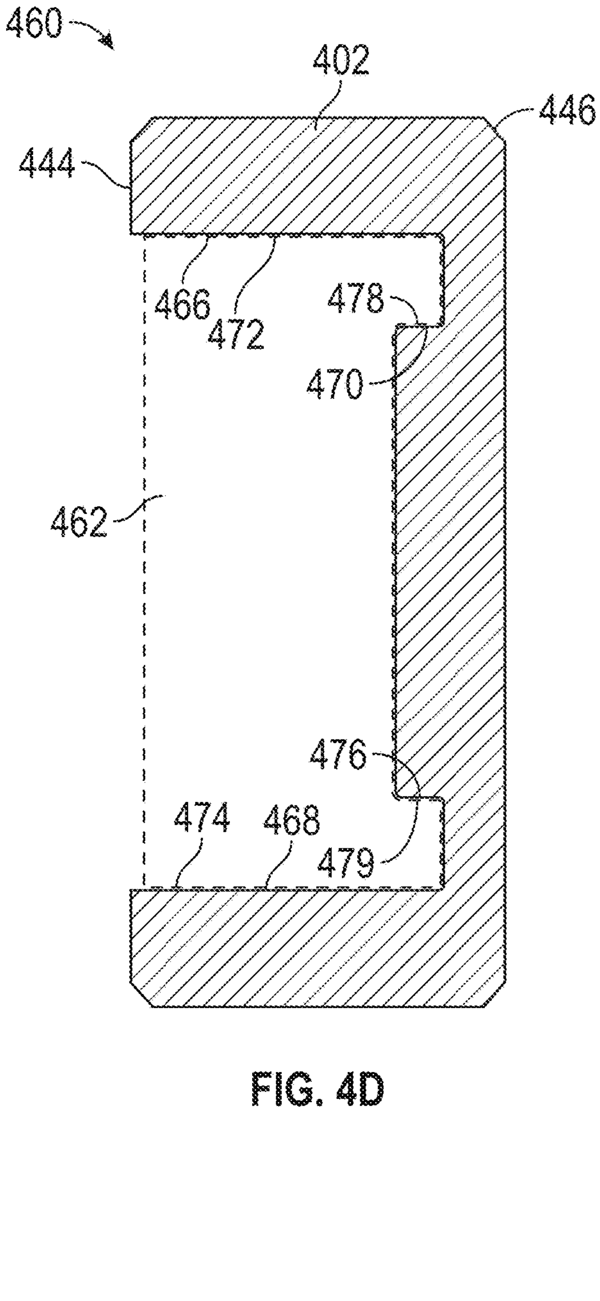
FIG. 4D shows a side view of a third body in accordance with one or more embodiments.

FIG. 4D shows a side profile view 460 of a third body 402 in the first embodiment of the second device 400 for reducing vibrations in accordance with one or more embodiments. In one or more embodiments, the third body 402 includes a third body cutout portion 462, as described above. The third body cutout portion 462 may define a third body first step 466 which includes a substantially flat surface on the third body 402 formed on a third body cutout portion first upper side 472. In one or more embodiments, the third body 402 further includes a third body second step 470. The third body second step 470 may be formed by a third body cutout portion first lower side 478 within the third inward-facing inner wall surface 444 of the third body 402.

The third body cutout portion 462 may also have a third body third step 468 which includes a substantially flat surface on the third body 402 formed on a third body cutout portion second lower side 474. In one or more embodiments, the third body 403 further includes a third body fourth step 476. The third body fourth step 476 may be formed by a third body cutout portion second upper side 479 within the third inward-facing inner wall surface 444 of the third body 402.

Figure 4E:
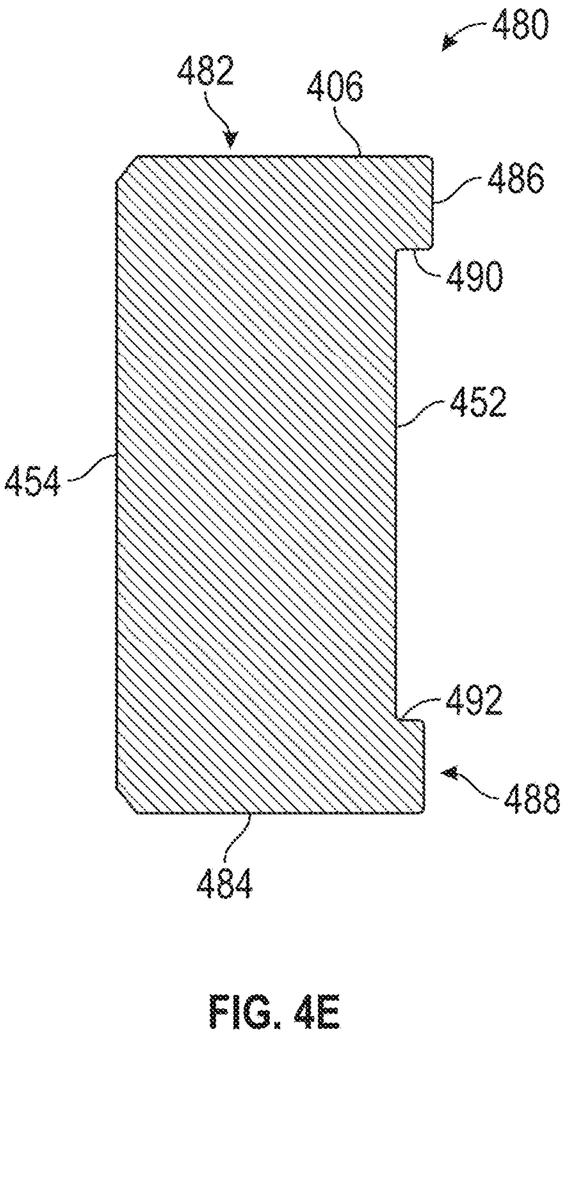
FIG. 4E shows a side view of a fourth body in accordance with one or more embodiments.

FIG. 4E shows a side profile view 480 of a fourth body 406 in the first embodiment of the second device 400 for reducing vibrations. In one or more embodiments, the fourth body 406 includes a fourth body upper side 482 and a fourth body lower side 484, opposite the fourth body upper side 482. The fourth body 406 may further include a fourth body first nub 486 extending from the fourth outward-facing outer wall surface 452 proximate the fourth body upper side 482. The fourth body first nub 486 includes a portion of the fourth body 406 that extends a distance beyond the fourth outward-facing outer wall surface 452. In accordance with one or more embodiments, the fourth body first nub 486 has a rectangular-like edge and is configured to fit within a portion of the third body 402.

Furthermore, the fourth body 406 may also include a fourth body second nub 488 extending from the fourth outward-facing outer wall surface 452 proximate the fourth body lower side 484. The fourth body second nub 488 includes a portion of the fourth body 406 that extends a distance beyond the fourth outward-facing outer wall surface 452. In accordance with one or more embodiments, the fourth body second nub 488 has a rectangular-like edge and is configured to fit within a portion of the third body 402.

In one or more embodiments, the third body first step 466 is configured to abut the fourth body upper side 482 and the third body third step 468 is configured to abut the fourth body lower side 484. The third body second step 470 may abut a fourth body first nub lower side 490 on the fourth body first nub 486. Similarly, in one or more embodiments, the third body fourth step 476 may abut a fourth body second nub upper side 492 on the fourth body second nub 488.

In one or more embodiments, the first embodiment of the second device 400 for reducing vibrations may be configured to absorb mechanical vibrations within a pressure-control device (e.g., the choke valve 100 shown in FIG. 1A).

The third body 402 of one or more embodiments may be constructed of a material which is capable of providing a dynamic interface between the first embodiment of the second device 400 for reducing vibrations and one or more other components within a system (e.g., choke valve 100 shown in FIG. 1A). Specifically, the material used to construct the third body 402 may preferably have a low coefficient of friction. Examples of suitable materials which may be used to construct the third body 402 include but are not limited to polytetrafluoroethylene (PTFE), hard polyurethanes, and polyetheretherketone (PEEK).

The material used to construct the third body 402 may also contain one or more additives or fillers. Examples of additives and fillers include but are not limited to molybdenum disulfide ($MoS_2$), glass, graphite, and carbon.

The fourth body 406 of one or more embodiments may be constructed of a material having a high dampening capacity. Examples of suitable materials which may be used to construct the fourth body 406 include but are not limited to elastomers. Examples of elastomers include but are not limited to rubbers such as natural and synthetic rubber, hydrogenated nitrile butadiene rubber (HNBR), fluoroelastomers such as fluorine kautschuk material (FKM), FPM, fluorine based copolymers and terpolymers, or any other thermoset rubbers or thermoset composites.

The material used to construct the fourth body may generally have high dampening capacity, resistance to creep, and high degradation temperature. Accordingly, a suitable material for constructing the third body may be selected depending on wellbore conditions including time, temperature, frequency, and loading.

FIGS. 5A-D show a second embodiment of a second device 500 for reducing vibrations in accordance with one or more embodiments. The second embodiment of the second device 500 for reducing vibrations has a dynamic interface on an outer diameter as will be described below. As would be understood by one of ordinary skill in the art, reducing vibrations using a dynamic interface on an outer diameter may advantageously be used when the outer diameter contacts a sliding portion of the choke valve 100 (e.g., a portion of the choke valve 100 that slides when the choke valve 100 is opened or closed).

Figure 5A:
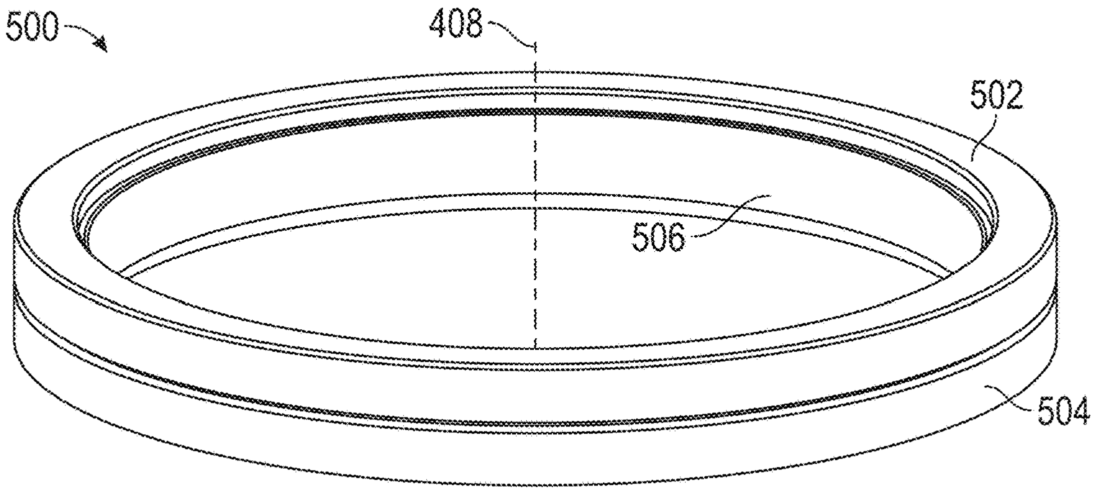
FIGS. 5A-C illustrate a second embodiment of a second device for reducing vibrations in accordance with one or more embodiments.

FIG. 5A is an isometric view of the second embodiment of the second device 500 for reducing vibrations according to one or more embodiments. The second embodiment of the second device 500 for reducing vibrations may include a third body first half 502, a third body second half 504, and a fourth body 406. As shown in FIG. 5A, the third body first half 502 may be axially stacked on the third body second half 504 about a second device internal axis 308.

Figure 5B:
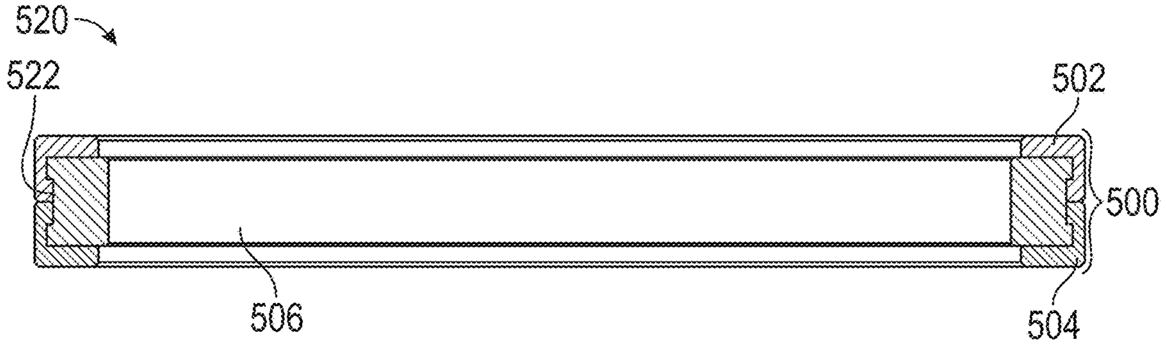

FIG. 5B shows a first cutaway view 520 of a second embodiment of the second device 500 for reducing vibrations in accordance with one or more embodiments. Axially stacking the third body first half 502 on the third body second half 504 may create a small gap 522. The small gap 522 may be created due to chamfers on the outer surfaces of the third body first half 502 and the third body second half 504. In FIG. 5B, the fourth body 406 is radially inserted around an inner diameter of the third body first half 502 and the third body second half 504.

Figure 5C:
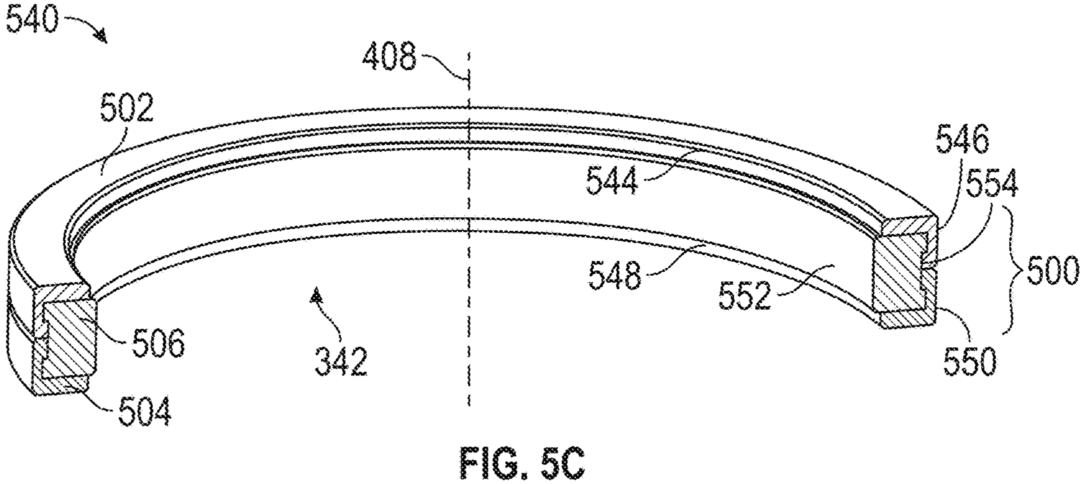

FIG. 5C shows a second cutaway view 540 of a second embodiment of the second device 500 for reducing vibrations in accordance with one or more embodiments. As best shown in FIG. 5C, the third body first half 502 includes a third body first half inward-facing inner wall surface 544 and a third body first half outward-facing outer wall surface 546. As will be shown in more detail in FIG. 5D, a portion of the third body first half outward-facing outer wall surface 546 of the third body first half 502 may be removed to form a third body first half cutout portion (e.g., 562 in FIG. 5D). Similarly, the third body second half 504 includes a third body second half inward-facing inner wall surface 548 and a third body second half outward-facing outer wall surface 550. As will be shown in more detail in FIG. 5D, a portion of the third body second half outward-facing outer wall surface 550 may be removed to form a third body second half cutout portion (e.g., 564 in FIG. 5D).

The fourth body 406 includes a fifth inward-facing inner wall surface 554 and a fifth outward-facing outer wall surface 552. The fifth inward-facing inner wall surface 554 may define a second device inner chamber 342 passing along a second device internal axis 308 of the second embodiment of the second device 500 for reducing vibrations. In one or more embodiments, the third body first half 502 and the third body second half 504 may be radially stacked around the fourth body 406. Specifically, the fifth outward-facing outer wall surface 552 may abut the third body first half cutout portion 562 of the third body first half 502 and the third body second half cutout portion 564 of the third body second half 504.

Figure 5D:
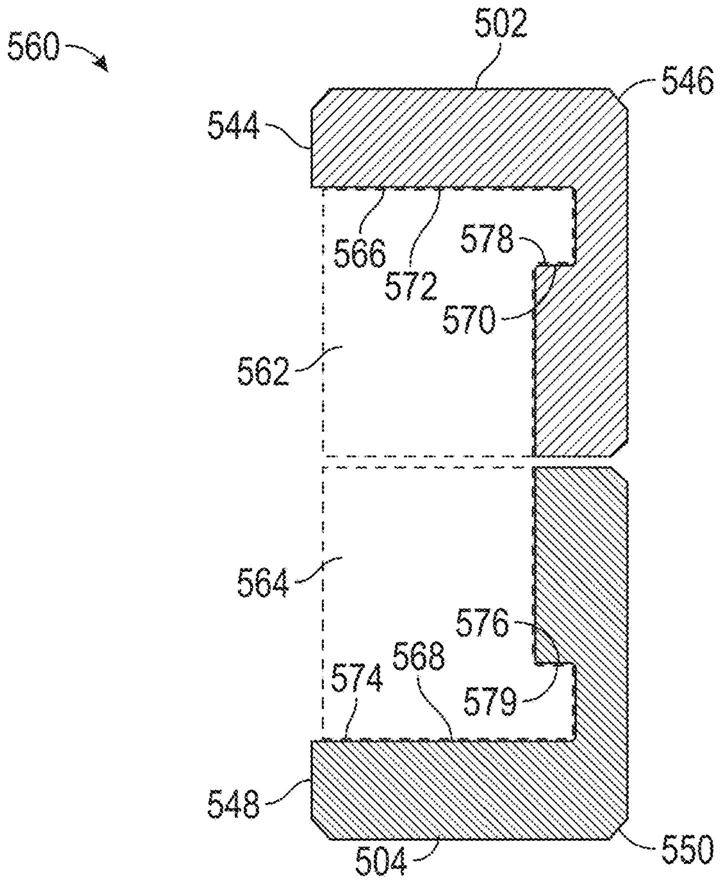
FIG. 5D shows a side view of a third body first half and a third body second half in accordance with one or more embodiments.

FIG. 5D shows a side profile view 560 of a third body first half 502 and a third body second half 504 in the second embodiment of the second device 500 for reducing vibrations. In one or more embodiments, the third body first half 502 includes a third body first half cutout portion 562, as described above. The third body first half cutout portion 562 may define a third body first half first step 566 which includes a substantially flat surface on the third body first half 502 formed on a third body first half cutout portion upper side 572. In one or more embodiments, the third body first half 502 further includes a third body first half second step 570. The third body first half second step 570 may be formed by a third body first half cutout portion lower side 578 within the third body first half inward-facing inner wall surface 544 of the third body first half 502.

In one or more embodiments, the third body second half 504 includes a third body second half cutout portion 564, as described above. The third body second half cutout portion 564 may define a third body second half first step 568 which includes a substantially flat surface on the third body second half 504 formed on a third body second half cutout portion lower side 574. In one or more embodiments, the third body second half 504 further includes a third body second half second step 576. The third body second half second step 576 may be formed by a third body second half cutout portion upper side 579 within the third body second half inward-facing inner wall surface 548 of the third body second half 504.

The fourth body 406 in the second embodiment of the second device 500 for reducing vibrations may have the same components as the fourth body 406 described in FIG. 4E. For the sake of brevity, the fourth body will not be described again herein.

In the second embodiment of the second device 500 for reducing vibrations, the fourth body first nub 486 has a rectangular-like edge and is configured to fit within a portion of the third body first half 502. Similarly, the fourth body second nub 488 has a rectangular-like edge and is configured to fit within a portion of the third body second half 504. In addition, the third body first half first step 566 is configured to abut the fourth body upper side 482 and the third body second half first step 568 is configured to abut the fourth body lower side 484. The third body first half second step 570 may abut a fourth body first nub lower side 490 on the fourth body first nub 486. Similarly, the third body second half second step 576 may abut a fourth body second nub upper side 492 on the fourth body second nub 488.

In one or more embodiments, the second embodiment of the second device 500 for reducing vibrations may be configured to absorb mechanical vibrations within a pressure-control device (e.g., the choke valve 100 shown in FIG. 1A).

The third body first half 502 of one or more embodiments may be constructed of a material which is capable of providing a dynamic interface between the second embodiment of the second device 500 for reducing vibrations and one or more other components within a system (e.g., choke valve 100 shown in FIG. 1A). Specifically, the material used to construct the third body first half 502 may preferably have a low coefficient of friction. Examples of suitable materials which may be used to construct the third body first half 502 include but are not limited to polytetrafluoroethylene (PTFE), hard polyurethanes, and polyetheretherketone (PEEK).

The material used to construct the third body first half 502 may also contain one or more additives or fillers. Examples of additives and fillers include but are not limited to molybdenum disulfide ($MoS_2$), glass, graphite, and carbon.

The third body second half 504 of one or more embodiments may also be constructed of a material which is capable of providing a dynamic interface between the second embodiment of the second device 500 for reducing vibrations and one or more other components within a system (e.g., choke valve 100 shown in FIG. 1A). Specifically, the material used to construct the third body second half 504 may preferably have a low coefficient of friction. Examples of suitable materials which may be used to construct the third body second half 504 include but are not limited to polytetrafluoroethylene (PTFE), hard polyurethanes, and polyetheretherketone (PEEK).

The material used to construct the third body second half 504 may also contain one or more additives or fillers. Examples of additives and fillers include but are not limited to molybdenum disulfide ($MoS_2$), glass, graphite, and carbon.

In some embodiments, the third body first half 502 and the third body second half 504 may be constructed from the same material. In some embodiments, the third body first half 502 and the third body second half 504 may be constructed from different materials.

The fourth body 406 of one or more embodiments may be constructed of a material having a high dampening capacity, as described above.

Figure 6:
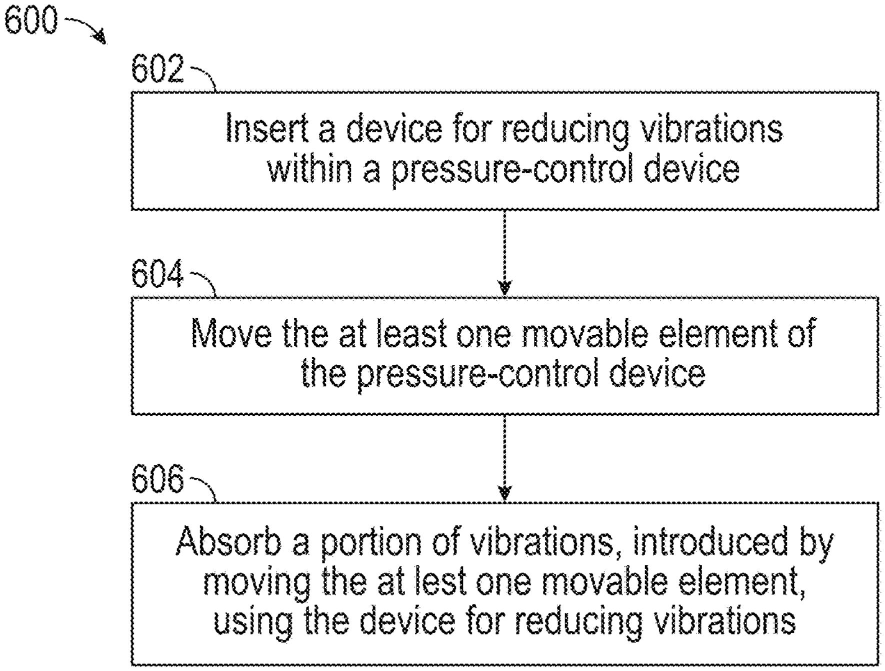
FIG. 6 is a flow chart of a method in accordance with one or more embodiments.

Embodiments disclosed herein also relate to methods for reducing vibrations. FIG. 6 is a flow chart of a method 600 according to one or more embodiments. The method will be described with reference to elements shown in FIG. 1B.

In one or more embodiments, the method 600 includes, in step 602, inserting a device (e.g., a first device 200, 300 and/or a second device 400, 500) for reducing vibrations within a pressure-control device (e.g., choke valve insert 105). In one or more embodiments, the pressure-control device (e.g., choke valve insert 105) includes at least one movable element (e.g., valve stem 125).

In one or more embodiments, the device (e.g., a first device 200, 300 and/or a second device 400, 500) for reducing vibrations includes a first body (e.g., 202 in FIGS. 2A-C, 406 in FIGS. 4A-C) comprising a first material inserted adjacent (e.g., first location 152 or second location 160) to the at least one movable element (e.g., valve stem 125) and a second body (e.g., 206 in FIGS. 2A-C, 402 in FIGS. 4A-C) comprising a second material. In one or more embodiments, the second body is positioned radially opposite the first body.

In one or more embodiments, the method 600 further includes in stem 604, moving the at least one movable element (e.g., valve stem 125) of the pressure-control device (e.g., choke valve insert 105).

In one or more embodiments, the method also includes, in step 606, absorbing a portion of vibrations, introduced by moving the at least one movable element (e.g., valve stem 125), using the device for reducing vibrations (e.g., a first device 200, 300 and/or a second device 400, 500). In one or more embodiments, the pressure-control device comprises a choke valve (e.g., choke valve 100 in FIG. 1A, choke valve insert 105 in FIG. 1B) or a gate valve.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A first device for reducing vibrations, comprising:

a first body having a first outward-facing outer wall surface and a first inward-facing inner wall surface, wherein a portion of the first outward-facing outer wall surface is removed to form a first cutout portion; and a second body having a second outward-facing outer wall surface and a second inward-facing inner wall surface, the second body comprising:

a second body first nub extending from the second body proximate a second body upper side and a second body second nub extending from the second body proximate a second body lower side;

a first body first step abuts a second body first nub lower side; and a first body second step abuts a second body second nub upper side, wherein the second body is radially stacked around the first outward-facing outer wall surface within the first cutout portion of the first body, and wherein the first device is configured to absorb mechanical vibrations within a pressure-control device.

2. The first device of claim 1, wherein:

the first body comprises;

a first body fourth step formed on a first cutout portion first upper side, the first body first step formed on a first cutout portion first lower side, a first body third step formed on a first cutout portion second lower side, and the first body second step formed on a first cutout portion second upper side;

the first body fourth step is configured to abut the second body upper side; and the first body third step is configured to abut the second body lower side, the second body lower side located opposite the second body upper side.

3. The first device of claim 1, wherein the first body comprises polytetrafluoroethylene.

4. The first device of claim 1, wherein the second body comprises an elastomer.

5. The first device of claim 1, wherein the first body further comprises:

a first body first half having a first body first half outward-facing outer wall surface and a first body first half inward-facing inner wall surface, wherein a portion of the first body first half outward-facing outer wall surface is removed to form a first body first half cutout portion; and a first body second half having a first body second half outward-facing outer wall surface and a first body second half inward-facing inner wall surface, wherein a portion of the first body second half outward-facing outer wall surface is removed to form a first body second half cutout portion, wherein the first body first half is axially stacked on the first body second half, wherein the second body is radially stacked around the first body first half outward-facing outer wall surface within the first body first half cutout portion and around the first body second half outward-facing outer wall surface within the first body second half cutout portion of the first body second half, and wherein the first device is configured to absorb mechanical vibrations within the pressure-control device.

6. The first device of claim 5, wherein:

the first body first half comprises;

a first body first half first step formed on a first body first half cutout portion upper side, and a first body first half second step formed on a first body first half cutout portion lower side, the first body second half comprises;

a first body second half first step formed on a first body second half cutout portion lower side, and a first body second half second step formed on a first body second half cutout portion upper side;

the first body first half first step is configured to abut a second body upper side; and the first body second half first step is configured to abut a second body lower side, the second body lower side located opposite the second body upper side.

7. The first device of claim 6, wherein:

the second body comprises a second body first nub extending from the second body proximate the second body upper side and a second body second nub extending from the second body proximate the second body lower side;

the first body first half second step abuts a second body first nub lower side; and the first body second half second step abuts a second body second nub upper side.

8. The first device of claim 5, wherein the first body first half and the first body second half comprise polytetrafluoroethylene.

* * * * *